United States Patent
Shemer et al.

(10) Patent No.: US 11,669,407 B2
(45) Date of Patent: Jun. 6, 2023

(54) OPTIMIZED CLIENT-SIDE DEDUPLICATION

(71) Applicant: EMC IP Holding Company LLC, Hopkinton, MA (US)

(72) Inventors: Jehuda Shemer, Kfar Saba (IL); Maxim Drobachevsky, Beer Sheva (IL); Zion Drori, Kfar Yona (IL)

(73) Assignee: EMC IP HOLDING COMPANY LLC, Hopkinton, MA (US)

(*) Notice: Subject to any disclaimer, the term of this patent is extended or adjusted under 35 U.S.C. 154(b) by 76 days.

(21) Appl. No.: 17/449,717

(22) Filed: Oct. 1, 2021

(65) Prior Publication Data

US 2023/0103955 A1 Apr. 6, 2023

(51) Int. Cl.
*G06F 16/00* (2019.01)
*G06F 11/14* (2006.01)
*G06F 16/174* (2019.01)

(52) U.S. Cl.
CPC ...... *G06F 11/1453* (2013.01); *G06F 16/1748* (2019.01)

(58) Field of Classification Search
CPC .............. G06F 11/1453; G06F 16/1748
See application file for complete search history.

(56) References Cited

U.S. PATENT DOCUMENTS

| 8,214,428 | B1 | 7/2012 | Christiaens |
| 10,409,778 | B1* | 9/2019 | Zhao ............. G06F 16/2365 |
| 2021/0357293 | A1 | 11/2021 | Mathew et al. |

OTHER PUBLICATIONS

NetApp Knowledge Base, How does the deduplication changelog work?, Apr. 23, 2021, retrieved on Feb. 1, 2023, retrieved from the Internet <URL: https://kb.netapp.com/Advice_and_Troubleshooting/Data_Storage_Software/ONTAP_OS/How_does_the_deduplication_changelog_work> (Year: 2021).*

* cited by examiner

*Primary Examiner* — Tyler J Torgrimson
(74) *Attorney, Agent, or Firm* — Workman Nydegger

(57) ABSTRACT

One example method includes optimizing client-side deduplication. When backing up a client, a cadence and a change log resolution are determined. These values are evaluated alone or in combination with respect to various thresholds. Client-side deduplication is enabled or disabled based on whether any one or more of the thresholds are satisfied.

20 Claims, 7 Drawing Sheets

OPTIMIZED CLIENT-SIDE DEDUPLICATION

FIELD OF THE INVENTION

Embodiments of the present invention generally relate to data protection operations. More particularly, at least some embodiments of the invention relate to systems, hardware, software, computer-readable media, and methods for data protection operations including deduplication operations.

BACKGROUND

Data protection operations are performed to protect data and ensure that, in the event of corruption, loss, or other event, data can be restored. Protecting data, however, continues to present new challenges. For example, the size of data to be protected in continually increasing. Further, there are many ways in which in user may protect their data. A user may decide, for example, between continuous backup operations, periodic backups, and the like. These decisions are further complicated by the computing environments in which data is stored and the environments in which backups may be stored. As a result, data protection operations can be complicated and complex.

In addition, decisions regarding data protection operations are no longer driven by a few factors such as the size of the data being protected. It is necessary to consider other factors such as bandwidth, deduplication, encryption, and type of backup. There is a need to identify ways to improve various aspects of data protection operations.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Embodiments of the present invention generally relate to data protection operations. More particularly, at least some embodiments of the invention relate to systems, hardware, software, computer-readable media, and methods for data protection operations including backup operations and deduplication operations.

Backup operations and deduplication operations are examples of data protection operations. In fact, deduplication operations are often performed in the context of backup operations. Deduplication can benefit a system by reducing the amount of data that needs to be transferred to the backup storage and reduce storage requirements. Deduplication can be performed at the source or client side of a backup operation or at a target or server side of the backup operation.

Embodiments of the invention help a data protection system determine when deduplication can be beneficially performed and when deduplication should not be performed. More specifically, deduplicating data on the client side, before sending the data to cloud storage, can reduce transmission requirements. At the same time, deduplication can also impact the performance on the client side by consuming computing resources. For example, when processing data that cannot be deduplicated (e.g., all new data), performing deduplication simply consumes resources. By selectively enabling/disabling deduplication, embodiments of the invention can improve the performance of the data protection system.

Embodiments of the invention may determine when to enable deduplication operations at the client side and when to disable deduplication operations on the client side. More specifically, a data protection system often tracks changes to a volume when performing backup operations. When a backup is triggered, it is only necessary to transmit the data that has changed since the last backup. Changes are tracked using a change log, where each bit in the change log corresponds to a portion of the disk (e.g., an extent). When a backup is triggered, the extents corresponding to the set bits in the change log are transmitted. If the amount of data actually changed in an extent is small compared to the size of the extent, then deduplication may be beneficial because much of the data in the extent already exists in the backups.

In some examples, the size of the change log may be fixed. As the size of a volume increases, the extent sizes increase. Thus, the change log granularity can be used when determining whether to perform deduplication. In addition, the cadence or rate at which backups are performed may also impact how much of an extent is changed. Embodiments of the invention may enable/disable deduplication based on the change log granularity and/or backup cadence.

Figure 1:
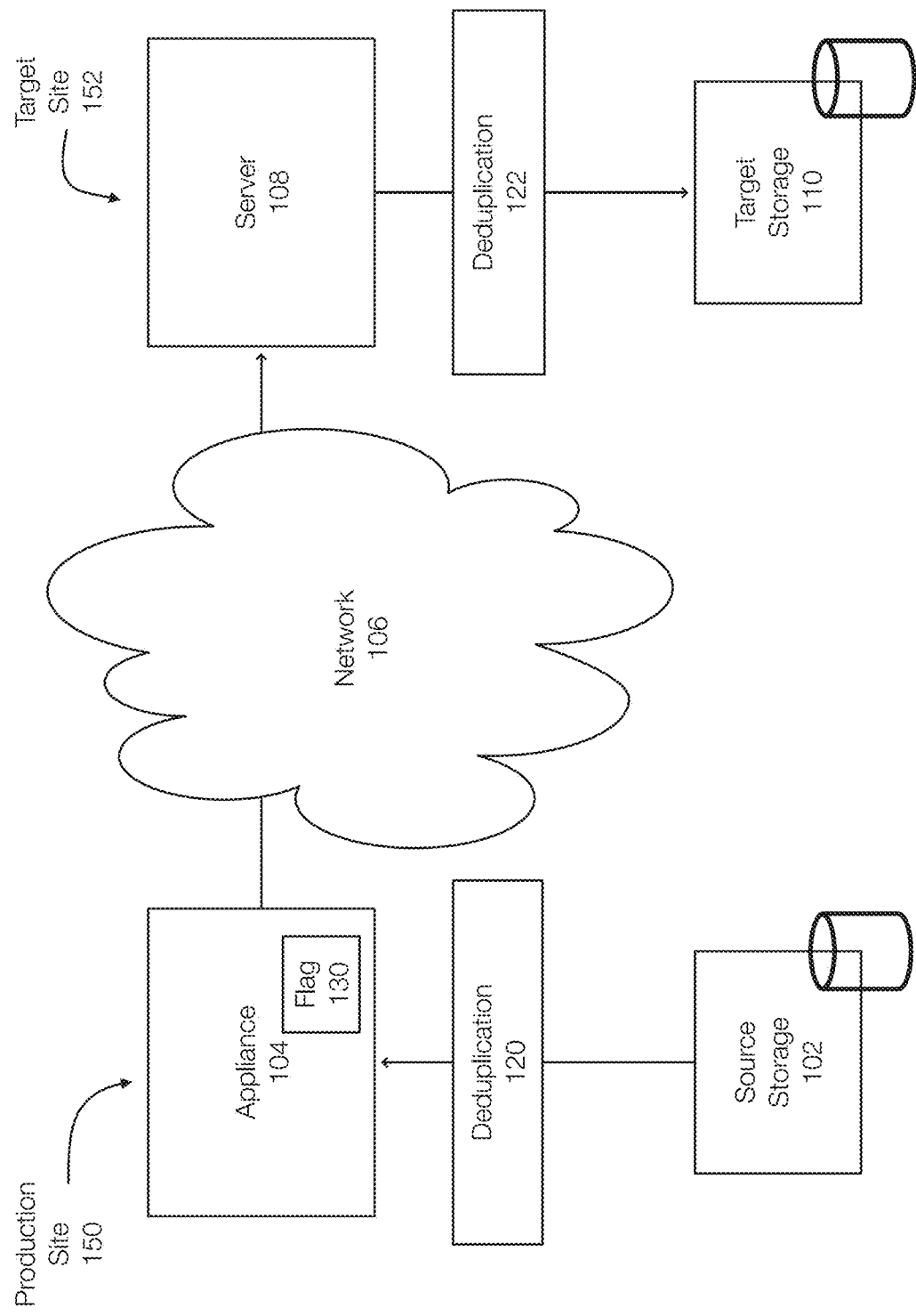
FIG. 1 discloses aspects of a computing environment including a data protection system configured to perform data protection operations including client-side deduplication operations.

FIG. 1 discloses aspects of a data protection operation. FIG. 1 illustrates a production site 150 and a target site 152. Generally, data and/or applications operating at the production site 150 are backed up at the target site 152. The backup operation may include replication backups, mirroring backups, incremental backups, journal-based backups, or the like. The production site 150 and/or the target site 152 may be on-site systems, cloud-based systems, and may use virtual machines, physical machines, containers, or the like or combination thereof.

At the production site 150, an appliance 104, which may represent multiple appliances, may be installed and may operate as a physical machine, a virtual machine, a container, or the like. The server 108 may similarly be physical, virtual, container based, or the like. The appliance 104 may also represent a data protection system, which may include one or more devices, software components, or the like.

Generally, the appliance 104 is configured to protect applications and/or data stored at the source storage 102 by creating a backup of data on the source storage 102 (e.g., a copy of the applications and/or data) to the target site 152. At the target site 152, the server 108 may commit the backup to the target storage. The storage 102 and 110 may include virtual volumes or disks, physical volumes or disks, or other storage devices and arrangements. The server 108 may perform deduplication operations, encryption operations, or the like in addition to storing the backups on the target storage 110.

To improve the efficiency of a backup operation, the appliance 104 may perform operations such as deduplication 120. The server 108 may also perform deduplication 122. Deduplication can improve a backup operation, by way of example, by reducing the amount of data transferred over the network 106 and by reducing storage requirements at the target site 152.

In general, deduplication is performed by chunking the data into chunks. Each chunk usually has the same size, although variable sized chunking may be employed. Next a hash is generated for each chunk and stored. The hash is a unique representation of the chunk. The chunk size may vary. An example chunk size is 8 KB, but the chunk may be smaller or larger. Changing the chunk size may impact efficiencies. For example, large chunk sizes may not deduplicate as efficiently as smaller chunk sizes. Deduplicating using smaller chunk sizes, on the other hand, may consume processing resources.

When deduplicating, the appliance 104 may generate a hash of a chunk and then transmit the hash to the server 108 to determine if the chunk already exists on the target storage 110. Because the server 108 maintains metadata identifying a list of chunks stored in the target storage 110 and the corresponding hashes or identifiers of the chunks, the server 108 can inform the appliance 104 whether the chunk is already present at the target site 152. When the chunk is already present, metadata related to the chunk can be transferred instead of the chunk itself. This eliminates the need to transfer the chunk over the network 106. However, if the chunk is not present at the target site 152, it is necessary to transmit the chunk itself to perform the backup operation.

Performing deduplication 120 at the production site 150 can consume resources including processor resources and memory resources. When transferring larger amounts of data (e.g., an initial or genesis backup such as a full backup), it is possible that performing deduplication can improve performance. When transferring a smaller amount of data (e.g., an incremental backup), performing deduplication may adversely impact performance.

Embodiments of the invention relate to determining when to perform deduplication 120 and when to not perform deduplication 120. The appliance 104 may be configured to determine when to perform deduplication 120 and when to cease deduplication 120. Each time a backup operation is performed, a decision regarding whether to perform deduplication 120 may be made.

More specifically, deduplication is based on hashing data and using the hash to find copies of the data. Storing the hash instead of the full data allows reduction in storage requirements for duplicate occurrences of that data. Client-side deduplication allows communication (e.g., the amount of data transferred) between a data source (e.g., the source storage 102) and a deduplication target (e.g., the target storage 110) to be optimized.

As previously stated, the client calculates a hash of data (e.g., of a chunk) and then sends the hash to the target. If the hash already exists on the target, there is no need to send the chunk itself. Otherwise, the full chunk is sent to the target site 152.

The tradeoff is processing resources on the client or production side (e.g., to calculate the hash) and, potentially, two round trip communications if the hash does not exist at the target site 152. If the hash does exist, bandwidth is used more efficiently and processing is reduced at the target site 152.

In one example, a flag 130 is used to determine whether or not the appliance 104 performs deduplication 120. If the flag 130 is set, deduplication is performed when opening a backup stream to the target site 152. When the flag 130 is not set or is disabled, data is sent without performing deduplication 120.

In some embodiments, the decision to set or not set the flag 130 (or the decision to perform or not perform deduplication) is based on factors or characteristics such as a change log resolution and a backup cadence. The change log resolution identifies the size of the extents represented by each bit in the change log. The change log resolution can be determined regardless of whether the size of the change log is fixed or variable. For example, if the change log is fixed and includes 2 million entries or bits, then the resolution can be determined by dividing the volume size by the number of entries. Changes on a 1 Terabyte (TB) volume are based on an extent size of 500 KB. Changes to a 500 Gigabyte (GB) volume are tracked based on an extent size of 250 KB. Changes to a 64 TB volume are tracked based on an extent size of 32 MB.

The size of the extent can influence the decision to perform/not perform deduplication. When the change log has a low resolution (higher extent size), there is a higher likelihood that less of the extent has actually been changed. In other words, the amount of data in the extent that has been overwritten or changed is small compared to the size of the extent. As a result, deduplication is likely effective because much of the data in the extent already exists and can be deduplicated.

For example, a write of 25 KB to an extent size of 50 KB indicates that about half of the data may be deduplicated. In other words, the overwrite ratio is about 50%. A write of 25 KB to an extent size of 250 KB indicates that about 90% of the extent may be deduplicated. In other words, the overwrite ratio is about 10% in this example. Embodiments of the invention thus consider the change log resolution when determine whether to perform deduplication.

The backup cadence or RPO (Recovery Point Objective) may be set such that backups are performed according to a cadence. Backups may be performed every 15 minutes, every hour, every day, or the like. When the cadence is short (e.g., 15 minutes), this suggests that the amount of overwrite on an extent is low. When the cadence is longer (e.g., 1 day), this suggests that the amount of overwrite may be higher for any given extent at least because more data accumulates over time.

Based on these characteristics, the decision of whether to perform deduplication (or other operations) can be made heuristically. For example, deduplication should not be performed for volumes corresponding to an extent size of 8 KB. On the other hand, deduplication should be performed when the extent size is 32 MB. Thus, there may be lower and upper thresholds at which the flag 130 is set or unset.

For example, a first level heuristic may specify that when an extent size is larger than a threshold size, deduplication is enabled. A second heuristic may indicate that, as the cadence is lengthened, increase the threshold size. For example, deduplication may be enabled when the cadence is 15 minutes and the extent size is 64 KB or greater. If the cadence is 24 hours, deduplication may be enabled when the extent is 128 KB or greater.

Figure 2:
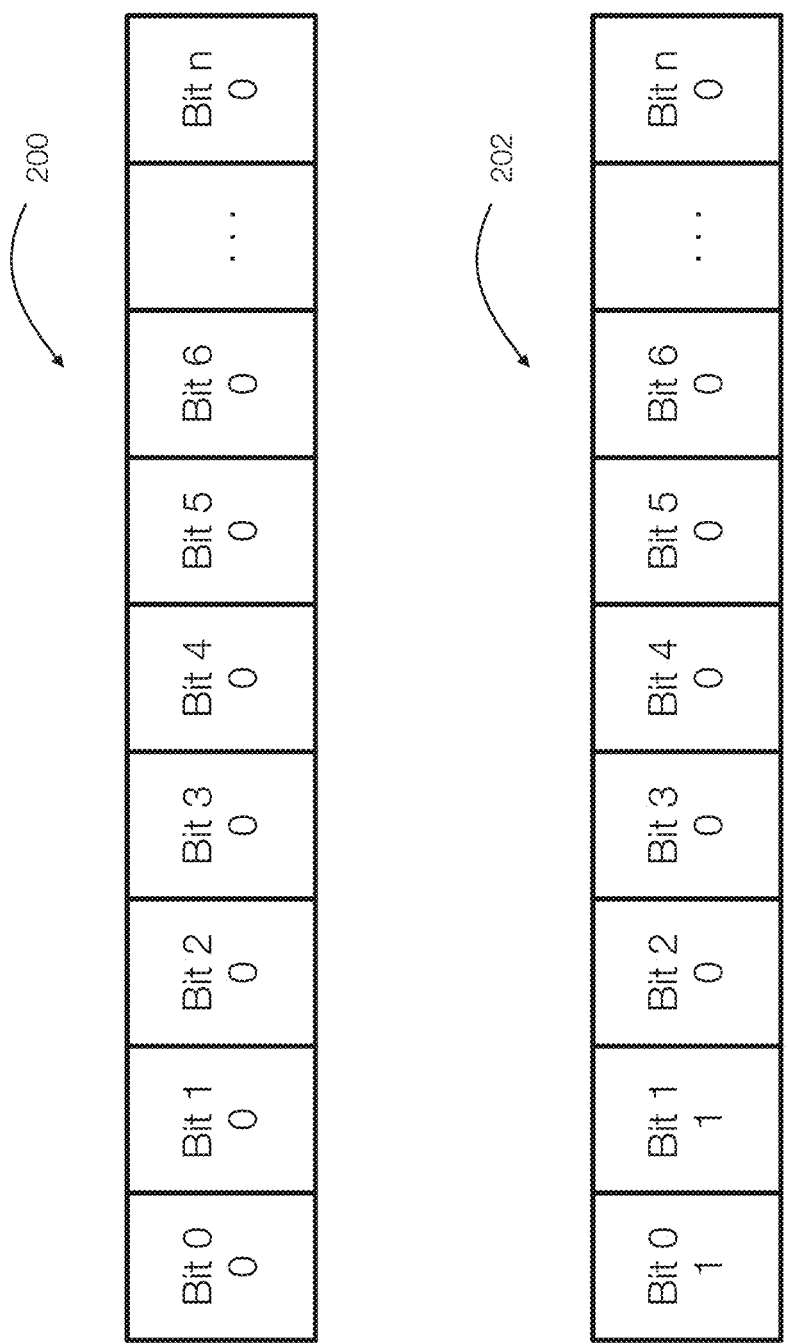
FIG. 2 discloses aspects of a change log for tracking changes to a storage such as a volume.

FIG. 2 discloses aspects of a change log, implemented as a change block tracking (CBT) bitmap. CBT is an algorithm used to track areas of a disk or volume (e.g., VMDK) that has changed since a previous backup or point in time. Each volume may be associated with a CBT bitmap. FIG. 2 illustrates an example of a simplistic bitmap. FIG. 2 illustrates a bitmap 200 in an initialized state and illustrates the same bitmap 202 after at least one IO since being initialized or reset. The bitmap 202 represents the bitmap 200 at a different point in time.

In one example, each bit in the CBT bitmap represents a fixed size extent (e.g., 64 KB) and the index of the bit correlates to a location on the volume. Thus, bit 0 (0 is the index) corresponds to a first location on a volume or, when the extent size is 64 KB, to the first 64 KB block on the volume and bit 1 represents the next 64 KB block on the volume. In this example each bit in the map 200 has a value of 0. Thus, the bitmap 200 is initialized or has been reset.

When an IO is performed at a location on the volume, the bits that correspond to that location are set to 1. A write may impact more than one bit in the CBT bitmap as illustrated in the map 202. Any overlap between the IO and the extent causes the corresponding bit to be set. Thus, a write of 72 KB to location 0 also impacts location 1. Thus, bit 0 and bit 1 are set to 1 as illustrated in the map 202 even though only 8 K of the extent or block associated with bit 1 is impacted by the write. At this stage, the remaining bits in the map 202 are still 0. Further, a write may be smaller than the extent size and still impact multiple extents. Thus, a write of 50 KB, in the context of a 64 KB extent, may result in at least two bits being set in the CBT.

In one example, the CBT bitmap is fixed in size. A bitmap of 256 KB provides for 2 million bits. However, the extent size per bit increases as the disk size increases. Generally, the granularity (extent size) is somewhere between 8 KB and 128 KB. However, the resolution may be larger (e.g., an extent size of 32 MB or larger). In another example, the CBT bitmap size is variable. By way of example and not limitation, the granularity may be between 8 KB and 128 KB (or smaller or larger). The size of the extent may also impact performance.

When performing, for example, an incremental backup, the CBT bitmap is used to identify which of the extents on the volume are copied to the target site. Only the extents at locations corresponding to set bits in the CBT bitmap need to be transferred during an incremental backup. Thus, if a backup operation is performed based on the bitmap 202, only the blocks at locations 0 and 1 are transferred. After the backup, the bitmap is reset such that all values are 0 in the bitmap. Alternatively, a new bit map is used.

In one example, the flag 130 is set each time a backup stream is opened or each time a backup operation is performed. For a generation 0 backup (e.g., an initial backup), the flag may be set because a full backup is likely to benefit from deduplication 120. Differential or incremental backups may not benefit from deduplication 120 and the flag 130 may be set to off. By applying the heuristics, the flag 130 can be set or unset each time a backup stream is opened.

Figure 3:
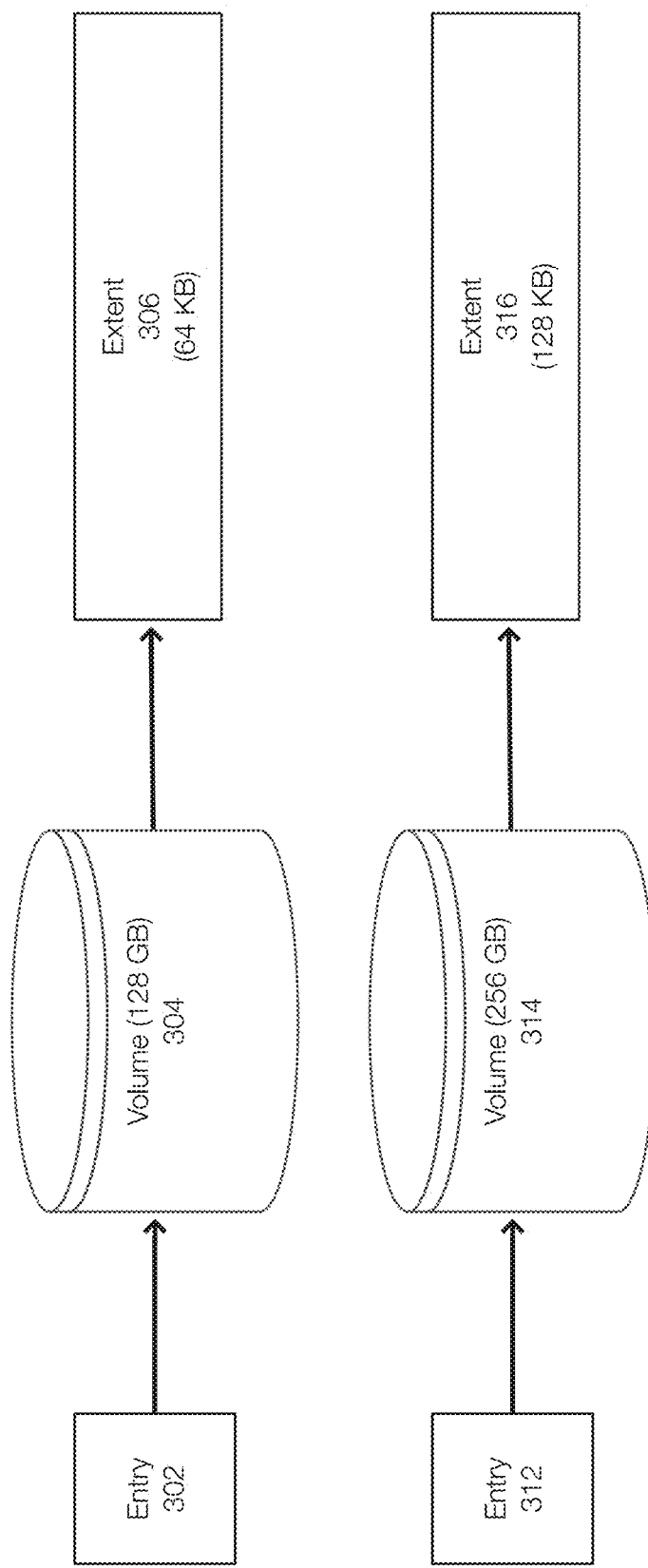
FIG. 3 discloses aspects a relationship between a change log or between change log entries and extent size for a volume.

FIG. 3 discloses aspects of extent sizes. FIG. 3 illustrates a 128 GB volume 304 and a 256 GB volume 314. For the volume 304, an entry 302 in a change log or CBT corresponds to 64 KB. Thus, the entry 302 corresponds to an extent 306 whose size is 64 KB. Similarly, for the volume 314, an entry 312 in a bitmap corresponds to an extent 316 whose size is 128 KB.

Figure 4:
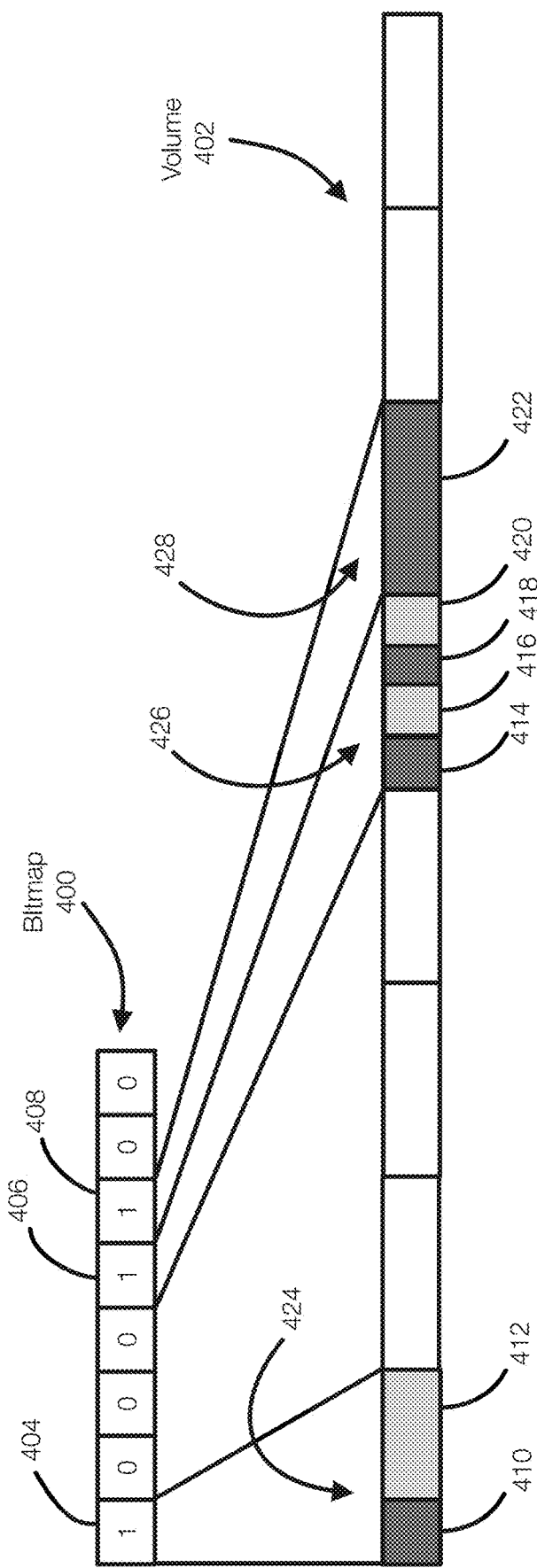
FIG. 4 discloses aspects of overwritten data in extents.

FIG. 4 discloses aspects of write operations and illustrates the application of heuristics. FIG. 4 illustrates a bitmap 400. In this example, the bitmap has 8 entries and bits 404, 406, and 408 are set to 1. Thus, the blocks or extents on the volume 402 corresponding to the bits 404, 406, and 408 have experienced IO or writes since the last time the bitmap 400 was reset. In some examples, resetting bitmap may include generating a new bitmap such that the old bitmap may be used to process entries that are dirty (that correspond to or identify extents or blocks that have experienced IOs).

In the volume 402, the dark grey corresponds to data written, light gray corresponds to previously existing data, and unshaded boxes have not been written to since the bitmap 400 was reset. Thus, the bits 404, 406, and 408 identify dirty extents.

By way of example and not limitation, the extent 424 on the volume 302 includes a changed portion 410 and a clean or unchanged portion 412. In this example, the size of the extent 424 may be 64 KB. The size of the changed portion 410 is 16 KB and the size of the unchanged portion 412 is 48 KB. Similarly, the extent 426 includes changed portions 414 and 418 and unchanged portions 416 and 420. The size of the changed portions 414 and 418 is (10 KB+10 KB or 20 KB) and the size of the unchanged portions 416 and 420 is 44 KB. The entire extent 428 is changed. Thus, the size of the changed portion 422 is 64 KB and the size of the unchanged portion is 0 KB for the extent 428.

Regardless of how much data is written to an extent, any change results in the corresponding bitmap entry being set to 1. Thus, the bit 404, 406, and 408 are each set to 1. The heuristics previously described allow the overwrite ratio to be determined or estimated. Embodiments of the invention may also account for the fact that the same portion of an extent may be written to multiple times. The overwrite pattern is workload specific, but is typically 25% to 30%.

Embodiments of the invention attempt to enable deduplication when the amount of data that has not been overwritten is less than a threshold percentage of the total data size. When the change log resolution is high (larger extent sizes) and the cadence is shorter, the flag 130 is likely to be set and client-side deduplication is performed. When these characteristics suggest that the amount of overwrite is high, then client side deduplication is disabled.

In some embodiments, the resolution of the tracking bitmap (e.g., bitmap 400) is different from the deduplication resolution. For example, the bitmap 400 may use a bit for each 64 KB extent on a volume. Thus, the bitmap resolution is 64 KB. The deduplication resolution, in contrast, may be smaller such as 8 KB. The deduplication ratio helps identify when the differences in the change log resolution may result in a performance improvement.

For example, if the bitmap resolution is 1 MB and a single 8 KB write occurred to an extent, the entire 1 MB extent is marked as dirty in the bitmap. When deduplicating on 8 KB sized chunks, this suggests that 99% of the extent can be deduplicated. In contrast, if the bitmap resolution is 64 KB and a single 8 KB write occurred, this suggests that about 88% of the extent can be deduplicated. If the write was for 32 KB, then only about 50% of the 64 KB extent can be deduplicated. Embodiments of the invention are thus configured to consider the change log resolution and/or the cadence when setting/unsetting the flag that controls deduplication.

Figure 5:
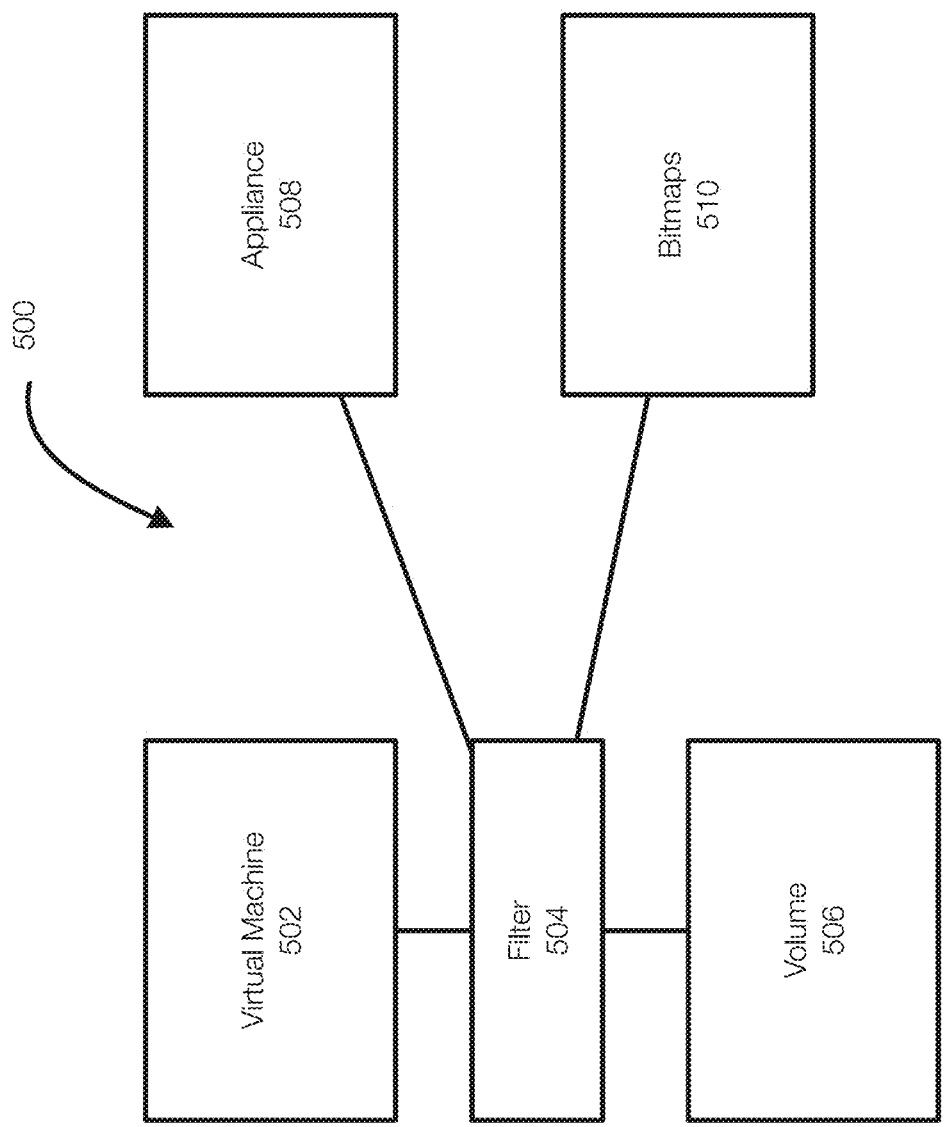
FIG. 5 discloses aspects of a data protection system implementing a decision to perform or not perform deduplication.

Embodiments of the invention further operate with multiple types of backups including snapshot based backups and light weight delta (LWD) based backups in physical and virtual environments. FIG. 5 illustrates a computing system in which snapshots, such as LWD snapshots, are created. The system 500 may include a virtual machine 520 that may be associated with a VMDK, such as volume 506. A filter 504 is implemented in the IO path between the virtual machine 502 and the volume 506.

The filter 504 may operate to help determine actual data size for use in evaluating the heuristics and provide information regarding how much data has been written. This information may be provided to the appliance 508. In addition, in LWD, for example, IOs may be marked in a bitmap (included in the bitmaps 510) by the filter 504 that may be present in, by way of example, the IO stack. When a snapshot is requested, a new bitmap (e.g., a new CBT bitmap) is created in the bitmaps 510 and the appliance 508 may begin processing the previous bitmap, which identifies which areas of the volume 506 are dirty or have experienced changes that need to be backed up. The dirty bits are processed and the corresponding data from the volume 506 is processed by the appliance 508. To process the data, cadence and the change log resolution are considered. Deduplication is then performed or not performed based on the these considerations. For example, a change log resolution of 128 KB and a cadence of 15 minutes may cause deduplication to be performed.

In some embodiments, these factors may be considered independently or together. For example, a cadence of 1 week may be sufficient to disable deduplication. A change log resolution of 32 MB may be sufficient to enable deduplication. These valuers may be considered together as previously described.

If a new IO is received for a dirty area that has not been processed or read, the new bitmap is marked, the data is read from the volume 506 by the filter 504 and stored in a demand log, which may be present in the bitmaps 510. This allows the snapshot to be created with minimal impact on the virtual machine 502 and/or the volume 506. A snapshot can be created without quiescing the virtual machine 502. When all of the dirty bits from the previous bitmap have been processed, the demand log is sent and the snapshot/deduplication is completed using the demand log. The demand log may then be deleted.

Figure 6:
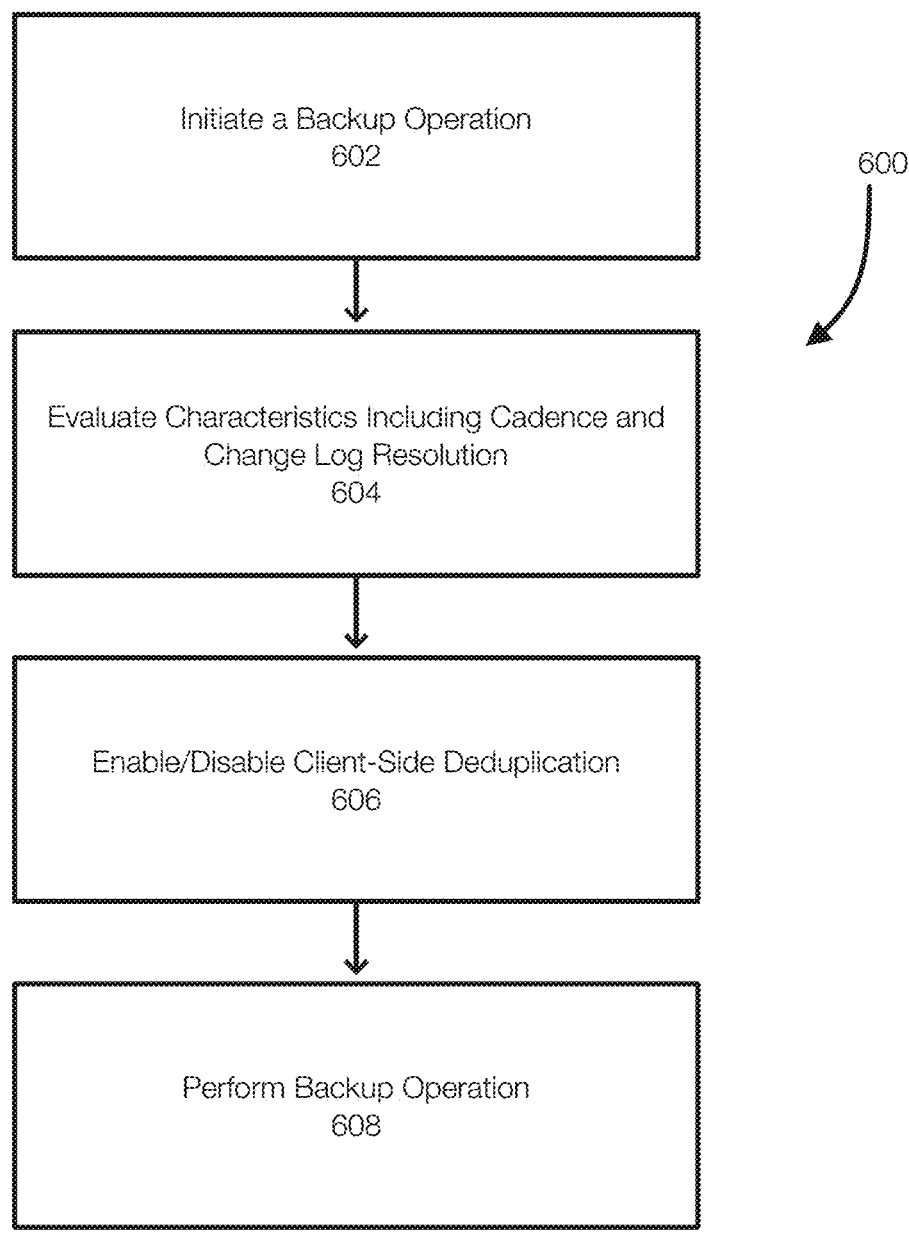
FIG. 6 discloses aspects of a method for enabling/disabling client side deduplication.

FIG. 6 discloses aspects of a method for performing data protection operation and, in particular, for performing a deduplication operation that may be part of a backup operation. In the method 600, a backup operation may be initiated 602. The backup operation may be initiated by opening a backup stream, taking a snapshot, or the like or combination thereof. Next, characteristics such as cadence and change log resolution are evaluated 604.

Client-side deduplication is then enabled or disabled 606 based on the whether the cadence and/or change log resolution satisfy thresholds. Several thresholds may be determined. For example, a cadence threshold may specify that if the cadence is higher than a specified time period, deduplication is disabled. A change log resolution threshold may specify that if the change log resolution is higher than a specified value, deduplication is enabled. A combination threshold may specify that when the change log resolution is higher than a first value and the cadence is a certain value, deduplication is enabled.

There may be multiple combination thresholds. For example, a 15 minute cadence (cadence less than or equal to a value) and a change log resolution of 64 KB (change log resolution higher than or equal to a value) may result in deduplication being enabled. When the cadence is different (e.g., higher than 15 minutes), the combination threshold may be associated with a higher change log resolution may also be required before the combination threshold is satisfied.

The overall goal is to set these parameters (cadence value and change log resolution value) such that the amount of data overwritten compared to the overall size of the corresponding extents is lower. This ensures that deduplication will be applied only when it is likely to be beneficial.

In another example, the threshold can be set on the volume size or extent size alone. In this example, incorporating the cadence may be optional.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data protection operations which may include, but are not limited to, data replication operations, IO replication operations, data read/write/delete operations, data deduplication operations, data backup operations, data restore operations, data cloning operations, data archiving operations, and disaster recovery operations. More generally, the scope of the invention embraces any operating environment in which the disclosed concepts may be useful.

In general however, the scope of the invention is not limited to any particular data backup platform or data storage environment.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, or virtual machines (VM), or containers.

Particularly, devices in the operating environment may take the form of software, physical machines, or VMs, containers, or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines or virtual machines (VM) or containers, though no particular component implementation is required for any embodiment.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

Any of the disclosed processes, operations, methods, and/or any portion of any of these, may be performed in response to, as a result of, and/or, based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted. Finally, and while it is not required, the individual processes that make up the various example methods disclosed herein are, in some embodiments, performed in the specific sequence recited in those examples. In other embodiments, the individual processes that make up a disclosed method may be performed in a sequence other than the specific sequence recited.

Following are some further example embodiments of the invention. These are presented only by way of example and are not intended to limit the scope of the invention in any way.

Embodiment 1. A method comprising initiating a backup operation of data stored on a volume, determining a change log resolution associated with a change log configured to track changes made to the volume, wherein each entry in the change log corresponds to an extent in the volume, wherein the change log resolution is associated with a size of the extent, enabling a client-side deduplication operation when the change log resolution is greater than or equal to a change log threshold, and performing the backup operation with the client-side deduplication when enabled.

Embodiment 2. The method of embodiment 1, wherein the change log comprises a bitmap for tracking changes to extents in the volume, further comprising determining a size of the extent, wherein the size of the extent is the change log resolution.

Embodiment 3. The method of embodiment 1 and/or 2, further comprising determining a cadence of the backup operation, wherein the client-side deduplication is enabled when the cadence is less than or equal to a cadence threshold.

Embodiment 4. The method of embodiment 1, 2, and/or 3, further comprising enabling the client-side deduplication when a combination of the change log resolution and the cadence satisfy a combination threshold.

Embodiment 5. The method of embodiment 1, 2, 3, and/or 4, wherein the change log threshold, the cadence threshold, and the combination threshold are independent and can each cause the client-side deduplication to be enabled.

Embodiment 6. The method of embodiment 1, 2, 3, 4, and/or 5, wherein the combination threshold is compared to a combination of the cadence and the change log resolution.

Embodiment 7. The method of embodiment 1, 2, 3, 4, 5, and/or 6, wherein the combination threshold includes a cadence value and a change log resolution value, wherein selecting a higher cadence value requires selecting a higher change log resolution value.

Embodiment 8. The method of embodiment 1, 2, 3, 4, 5, 6, and/or 7, wherein the change log resolution value selected for the change log threshold and for the combination threshold is based on measurements or approximated.

Embodiment 9. The method of embodiment 1, 2, 3, 4, 5, 6, 7, and/or 8, further comprising accounting for an actual amount of data written, wherein the change log threshold, the cadence threshold, and the combination threshold are set to ensure that performing the client-side deduplication benefits a performance of the backup operation.

Embodiment 10. The method of embodiment 1, 2, 3, 4, 5, 6, 7, 8, and/or 9, wherein a size of the change log is fixed or variable.

Embodiment 11. A method for performing any of the operations, methods, or processes, or any portion of any of these, or any combination thereof, disclosed herein including embodiments 1-10.

Embodiment 12. A non-transitory storage medium having stored therein instructions that are executable by one or more hardware processors to perform operations comprising the operations of any one or more of embodiments 1 through 11.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' or 'engine' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 7:
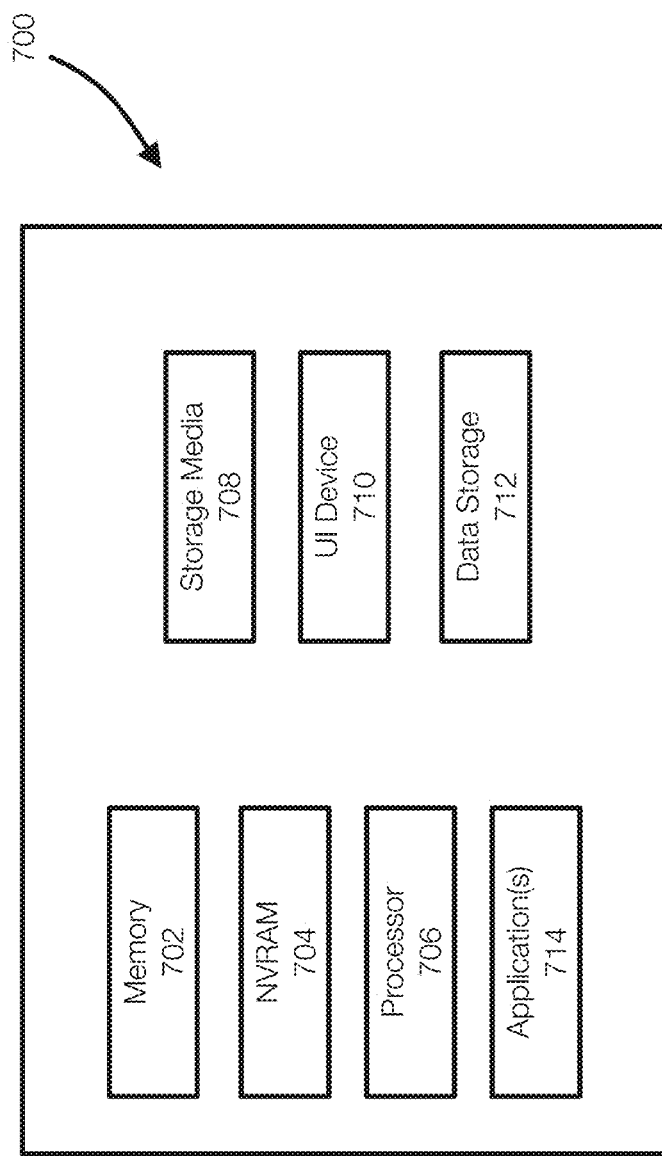
FIG. 7 discloses aspects of a computing system in which data protection operations may be implemented.

With reference briefly now to FIG. 7, any one or more of the entities disclosed, or implied, by the Figures and/or elsewhere herein, may take the form of, or include, or be implemented on, or hosted by, a physical computing device, one example of which is denoted at 700. As well, where any of the aforementioned elements comprise or consist of a virtual machine (VM), that VM may constitute a virtualization of any combination of the physical components disclosed in FIG. 7.

In the example of FIG. 7, the physical computing device 700 includes a memory 702 which may include one, some, or all, of random access memory (RAM), non-volatile memory (NVM) 704 such as NVRAM for example, read-only memory (ROM), and persistent memory, one or more hardware processors 706, non-transitory storage media 708, UI device 710, and data storage 712. One or more of the memory components 702 of the physical computing device 700 may take the form of solid state device (SSD) storage. As well, one or more applications 714 may be provided that comprise instructions executable by one or more hardware processors 706 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
   initiating a backup operation of data stored on a volume;
   determining a change log resolution associated with a change log configured to track changes made to the volume, wherein each entry in the change log corresponds to an extent in the volume, wherein the change log resolution is associated with a size of the extent;
   enabling a client-side deduplication operation when the change log resolution is greater than or equal to a change log threshold; and
   performing the backup operation with the client-side deduplication when enabled.

2. The method of claim 1, wherein the change log comprises a bitmap for tracking changes to extents in the volume, further comprising determining a size of the extent, wherein the size of the extent is the change log resolution.

3. The method of claim 2, further comprising determining a cadence of the backup operation, wherein the client-side deduplication is enabled when the cadence is less than or equal to a cadence threshold.

4. The method of claim 3, further comprising enabling the client-side deduplication when a combination of the change log resolution and the cadence satisfy a combination threshold.

5. The method of claim 4, wherein the change log threshold, the cadence threshold, and the combination threshold are independent and can each cause the client-side deduplication to be enabled.

6. The method of claim 4, wherein the combination threshold is compared to a combination of the cadence and the change log resolution.

7. The method of claim 6, wherein the combination threshold includes a cadence value and a change log resolution value, wherein selecting a higher cadence value requires selecting a higher change log resolution value.

8. The method of claim 7, wherein the change log resolution value selected for the change log threshold and for the combination threshold is based on measurements or approximated.

9. The method of claim 1, further comprising accounting for an actual amount of data written, wherein the change log threshold, the cadence threshold, and the combination threshold are set to ensure that performing the client-side deduplication benefits a performance of the backup operation.

10. The method of claim 1, wherein a size of the change log is fixed or variable.

11. A non-transitory storage medium having stored therein instructions that are executable by one or more hardware processors to perform operations comprising:
initiating a backup operation of data stored on a volume;
determining a change log resolution associated with a change log configured to track changes made to the volume, wherein each entry in the change log corresponds to an extent in the volume, wherein the change log resolution is associated with a size of the extent;
enabling a client-side deduplication operation when the change log resolution is greater than or equal to a change log threshold; and
performing the backup operation with the client-side deduplication when enabled.

12. The non-transitory storage medium of claim 11, wherein the change log comprises a bitmap for tracking changes to extents in the volume, further comprising determining a size of the extent, wherein the size of the extent is the change log resolution.

13. The non-transitory storage medium of claim 12, further comprising determining a cadence of the backup operation, wherein the client-side deduplication is enabled when the cadence is less than or equal to a cadence threshold.

14. The non-transitory storage medium of claim 13, further comprising enabling the client-side deduplication when a combination of the change log resolution and the cadence satisfy a combination threshold.

15. The non-transitory storage medium of claim 14, wherein the change log threshold, the cadence threshold, and the combination threshold are independent and can each cause the client-side deduplication to be enabled.

16. The non-transitory storage medium of claim 14, wherein the combination threshold is compared to a combination of the cadence and the change log resolution.

17. The non-transitory storage medium of claim 16, wherein the combination threshold includes a cadence value and a change log resolution value, wherein selecting a higher cadence value requires selecting a higher change log resolution value.

18. The non-transitory storage medium of claim 17, wherein the change log resolution value selected for the change log threshold and for the combination threshold is based on measurements or approximated.

19. The non-transitory storage medium of claim 11, further comprising accounting for an actual amount of data written, wherein the change log threshold, the cadence threshold, and the combination threshold are set to ensure that performing the client-side deduplication benefits a performance of the backup operation.

20. The non-transitory storage medium of claim 11, wherein a size of the change log is fixed or variable.

\* \* \* \* \*